United States Patent [19]

Wise, Jr. et al.

[11] Patent Number: 5,243,642
[45] Date of Patent: Sep. 7, 1993

[54] TELEPHONE CALL MANAGEMENT DEVICE

[75] Inventors: Laird H. Wise, Jr., Ellicott City, Md.; Michael H. Kendall, Fairfax, Va.

[73] Assignee: Bell Atlantic Network Services, Inc., Arlington, Va.

[21] Appl. No.: 729,121

[22] Filed: Jul. 12, 1991

[51] Int. Cl.⁵ .................................... H04M 1/00
[52] U.S. Cl. .................................... 379/82; 379/376
[58] Field of Search ........... 379/70, 79, 82, 67, 379/214, 33, 376

[56] References Cited

U.S. PATENT DOCUMENTS

| | | |
|---|---|---|
| 3,320,368 | 5/1967 | Applebaum . |
| 3,743,792 | 7/1973 | Duff et al. . |
| 4,280,021 | 7/1981 | Yuan . |
| 4,506,115 | 3/1985 | Schmitt . |
| 4,582,959 | 4/1986 | Myslinski et al. . |
| 4,620,063 | 10/1986 | Todd ........................ 379/82 X |
| 4,648,109 | 3/1987 | Boeckmann . |
| 4,821,311 | 4/1989 | Hashimoto .................... 379/88 |

OTHER PUBLICATIONS

Romar, LTD VMI-1000 Voice Message Waiting Indicating Brochure.
Alltel Supply Message Monitor Model 400MM Brochure.

Primary Examiner—James L. Dwyer
Assistant Examiner—Paul A. Fournier
Attorney, Agent, or Firm—Lowe, Price, LeBlanc & Becker

[57] ABSTRACT

A small portable self-contained, battery powered consumer premise call management device adapted to be connected to a telephone network termination node on a premise to provide audible monitoring of signals on the termination node by depression of a control button. The device includes a battery powered signal lamp triggered by a ringing signal and latched in an on condition until the control button is depressed. The device provides a call notification signal and is usable with and complementary to both network provide and consumer premise equipment providing telephone answering services.

8 Claims, 5 Drawing Sheets

TELEPHONE CALL MANAGEMENT DEVICE

TECHNICAL FIELD

The present invention relates generally to telecommunications equipment and more particularly to a customer premise call management device to provide detection and visual indication of incoming telephone calls and to perform message indication and monitoring functions in conjunction with either answering machines or central office based answering services.

BACKGROUND ART

Telephone answering is a telephone on-hook capability that provides a calling party who encounters a no-answer situation with the possibility of recording or leaving a message for the called party in response to a pre-recorded voice prompt. Such services are presently provided either as a central office or network function or through the use of customer premise equipment (CPE) customarily known as answering machines. When such an answering service is provided through the central office the called party may ascertain that a call was received by picking up the receiver to create an off-hook condition whereupon the central office provides an interrupted or stutter dial tone to indicate that a call was received and that any message may be retrieved. In the case of a CPE answering machine an indication that a call occurred is usually provided through an indicator light on the telephone answering machine. In the case of private branch exchange (PBX) systems an indicator light is commonly provided on the telephone instrument to serve as a message light. Examples of patents illustrating various forms of such notification include the following:

Applebaum U.S. Pat. No. 3,320,368 describes a hotel-type telephone set having a signal lamp. A battery powered ringing signal detector is provided to energize the signal flasher lamp and activate it to indicate that a message is waiting.

Myslinski et al U.S. Pat. No. 4,582,959 describes a PBX telephone answering message storage system which either permits storage of a message or stores a call back message on demand from a caller. In either case the system actuates an automatic message waiting lamp at the intended station in response to the storage of the message.

Schmitt U.S. Pat. No. 4,506,115 describes a message waiting lamp system wherein each hand set is provided with a message waiting lamp and a transmitter for actuating that lamp in response to an out of band signal.

Boeckmann U.S. Pat. No. 4,648,109 describes another PBX extension telephone message waiting indication in the form of an LED controlled from the PABX.

Yuan U.S. Pat. No. 4,280,021 discloses a signal waiting lamp activator for a PABX system.

Duff et al U.S. Pat. No. 3,742,792 describes a message waiting lamp and controller for use with key telephone systems.

In addition to the foregoing ROMAR Ltd. of Colorado Springs, Colo., has advertised a voice message waiting indicator that is a customer premise based product that automatically detects the presence of stutter dial tone on a central office, Centrex, or PBX line and activates a message-waiting light. The device is designed to be connected between the telephone set and a modular RJ11 jack. The device is said to begin an automatic detection process after an unanswered incoming call, after any off-hook resulting from an incoming or outgoing call, or periodically to detect system messages left when no call was placed to the user's telephone.

ALLTEL Supply of Norcross, Ga., has advertised a so-called Message Monitor which is said to allow users of a network-based voice mail service to call screen messages as they are being left within the network voice mailbox. The device appears to be relatively complex to program and entails the disadvantage of requiring an internal voice mail prompt (contained within the unit itself), before allowing the caller to leave a message within the network-based voice mailbox. In other words, two separate sets of prompts must be handled by the caller to arrive at the greeting in a subscriber's voice mailbox. There is also a time delay as a result of this requirement, approximately forty seconds, and the disadvantage of allowing the caller to hear a number of switch hook relays before the call arrives at the voice mailbox. In addition, this device includes circuitry to allow unanswered incoming calls to be automatically forwarded to a voice mail system (or to any other telephone number) using the standard central office 3-way calling feature. As the incoming call is forwarded, a speaker is activated enabling the user to monitor the message being left by the caller as is common in CPE telephone answering machines. The device is said to be usable with any single-party line equipped with tone dialing, 3-way calling and a touch tone telephone. The device is said to be fully programmable using a telephone touch tone dial at the point of sale, at the customer location, or from a remote location. The device includes a power supply which plugs into a standard AC outlet.

DISCLOSURE OF THE INVENTION

It is an object of the present invention to provide a new and improved call management device to detect and visually and audibly alert the called party of received calls in a variety of applications. The device is provided as a stylish, small, portable and inexpensive consumer premise unit which connects easily to all standard analog telephone systems that use modular connectors. The device utilizes a unique combination of AC ring detection and audible stutter tone (ST) notification to provide a visual and audible alert of incoming calls and/or messages received and also performs multiple monitoring functions. The device complements Voice Messaging Services, Independent Answering Bureaus, Telephone Answer Devices as well as other message/call notification applications, such as detection of various incoming signals for the purpose of notification of data and voice message storage such as electronic mail (E-Mail), electronic data interexchange (EDI) and facsimile transmission (FAX).

In operation, incoming calls are initially detected by an AC ring circuit that activates a light or lamp such as an LED or a liquid crystal display (LCD), which in either case accommodates circuitry to provide the notification or signaling of the number of calls received.

Upon noting the illuminated lamp the user may depress a reset button to turn off the lamp and actuate a monitor to provide an audible stutter or interrupted tone when a call or calls have been received. Other features incorporated in the device include a switch hook button which allows the user to go and on and off-hook and a speaker to permit the user to monitor the condition of the line including on-going voice signals on the involved telephone line. The device is adapted to provide a remote alert notification of incoming calls over the line located at any desired position in the premise away from the telephone. This feature makes the unit a useful adjunct to an answering machine which includes an integral signal light.

It is accordingly an object of the invention to provide a small, inexpensive, self-powered telephone adjunct capable of performing multiple functions including call and message notification, call monitoring, ring interruption, call forwarding and other functions for use with both a customer premise answering machine or a central office or network provided answering service.

It is another object of the invention to provide a telephone call management device which includes in a small portable housing a battery, a lamp, an energy conservation circuit for connecting the lamp to the battery for illuminating the lamp using a low duty cycle to provide a long battery life, a connector for connecting the device to a telephone line in a premise, a telephone line AC ring detector circuit which is responsive to a ringing signal to effect connection of the lamp to the battery through the energy conservation circuit to cause illumination of the lamp upon detection of a ringing signal, a latch circuit to latch the connection of the lamp to the battery beyond termination of the ringing signal, a manually actuatable switch for either terminating the connection to deactivate the lamp, or establishing a switch off-hook condition, and a speaker which is connected to audibly monitor signals on the telephone line in the premise when the manually actuatable switch is actuated.

It is another object of the invention to provide a telephone call management device of the foregoing type which includes a second manually operable switch mounted in the housing and effective in one switch position to cause the speaker to be connected to monitor the telephone signals without creating an off-hook condition which results in seizing the calling telephone line, and effective in a second position to cause the speaker to be connected to audibly monitor the signals on the telephone line by seizing the calling telephone line.

It is still another object of the invention to provide a telephone call management device of the foregoing type wherein all energization of the lamp is from the battery and wherein there is no drain on the battery other than following illumination of the lamp and continuing until such time as the manual actuating switch for extinguishing the lamp and initiating monitoring is released.

It is another object of the invention to provide an adjunct unit of the foregoing type which will readily meet FCC Registration and Underwriters Laboratories approval, and in addition, will meet standards required by telephone companies either national or international.

It is another object of the invention to provide an adjunct unit of the foregoing type which shall readily interface with various central office, PBX, PABX, and network-based systems for both foreign and domestic networks. This interface takes into account the various provisions of network based ring signaling, and off-hook line monitoring for various foreign and domestic networks.

It still another object of the invention to provide a device of the foregoing type at such a modest cost as to make the installation of multiple units readily feasible to provide remote notification and monitoring capabilities in both residential and business environments.

Additional objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments and its several details are capable of modifications in very obvious respects, all without departing from the invention. Accordingly, the drawings and description are to be regarded as illustrative in nature, and not as restrictive.

BEST MODE FOR CARRYING OUT THE INVENTION

Figure 1:
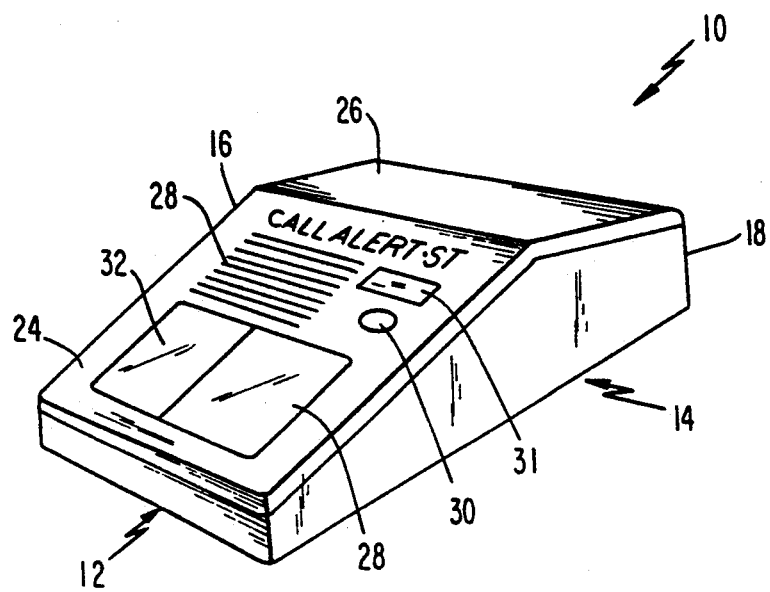
FIG. 1 is a perspective view of a telephone adjunct unit constructed according to a preferred embodiment of the invention.
Figure 2:
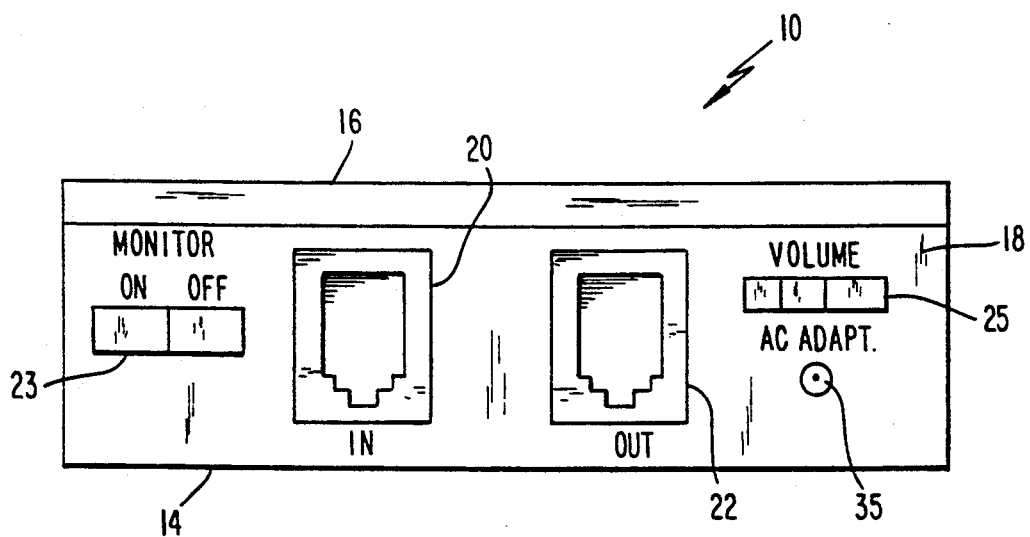
FIG. 2 is a vertical elevation of the rear side of the unit illustrated in FIG. 1 showing the connecting jacks and monitor switch.

Referring to FIG. 1 there is shown a preferred embodiment of the invention which comprises a small portable call management device which is indicated generally at 10. The device 10 comprises a housing 12 which may be formed of a molded plastic base 14 and cover 16. The cover may be snap fitted or secured by adhesive to the base. The housing 12 is provided with a back or rear wall 18 which is best seen in FIG. 2. A pair of RJ11 jacks 20 and 22 are mounted in the back wall to provide connection to a telephone line and telephone equipment such as a telephone instrument. These connections are labeled "IN" and "OUT" in FIG. 2.

The top 16 of the housing 10 in the illustrated embodiments is provided with a downwardly inclined operating surface or panel 24 joined to a top panel 26 which also is inclined downwardly in the illustrated embodiment of the invention. Formed in the operating panel 24 is a grill 28 for a speaker, a lamp 30 which may be an LED, an actuating/reset button 32 and a reset button 29. It will be understood that the buttons 32 and 29 may take any of a number of different shapes and may be raised above the level of the operating surface 24. An LCD display 31 may be provided to display a count of all incoming calls.

The unit 10 is compact and may, for example, be 1 inch in height, 3.5 inches in length and 2 inches in width. The device is adapted for mounting on a tabletop or any other surface or may be wall mounted. The small size makes the device convenient to install and place in an almost unlimited selection of positions in either a residential or business environment.

Figure 3:
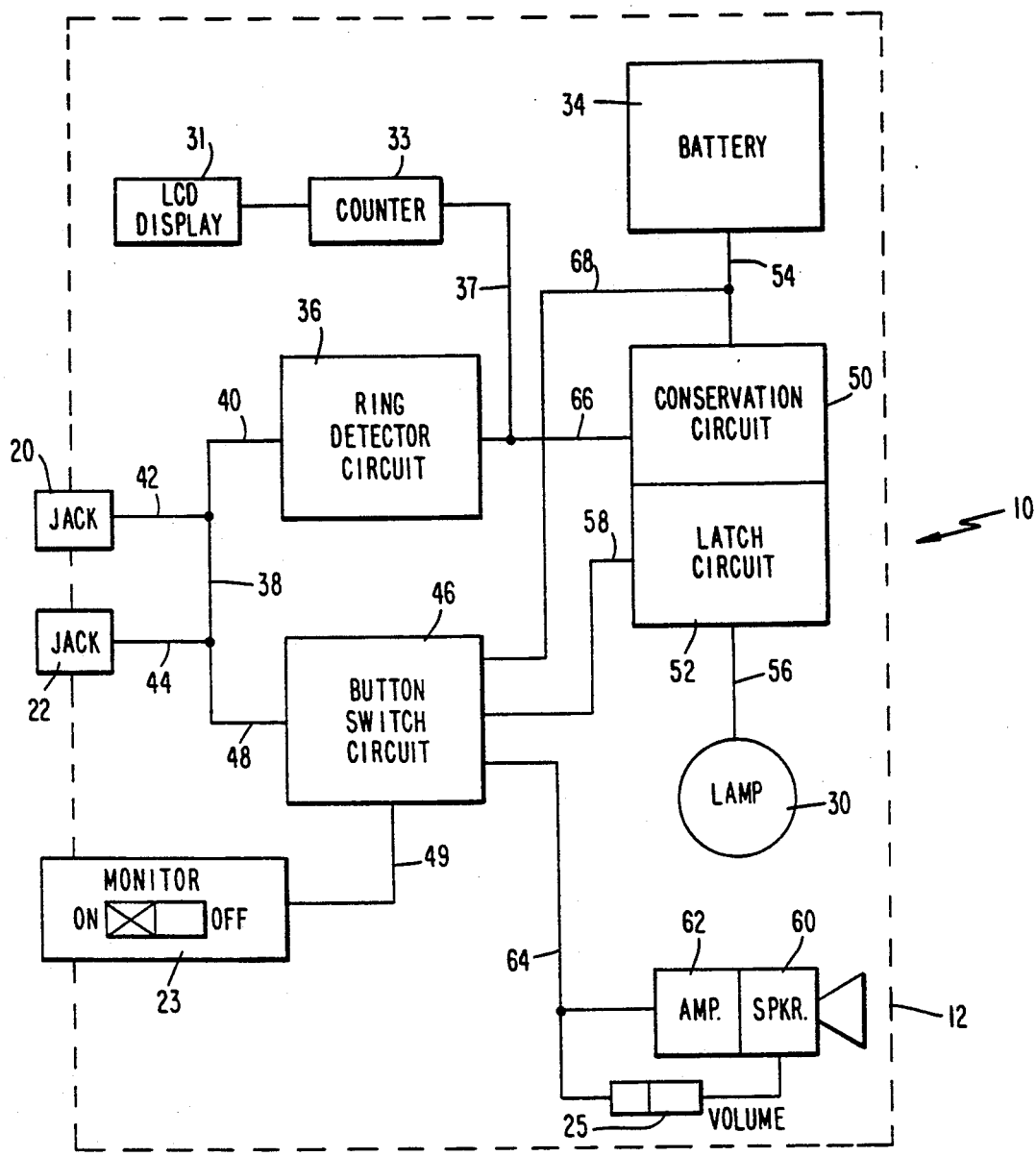
FIG. 3 is a diagrammatic block diagram illustration of the circuit elements of the preferred form of the invention.

Referring to FIG. 3 there is seen a block diagram of the device 10 with the housing indicated by the rectangle 12. The IN and OUT jacks 20 and 22 are seen at the left side of the drawing. A monitor switch 23 is mounted in the rear panel and is shown in the form of a slide switch having an on and off position. The lamp 30 preferably comprises a low current demand LED preferably requiring an operating current of no more than about 2 ma. A battery 34 is mounted in the housing to power the lamp and associated circuitry. The battery may comprise a single 9 volt battery mounted in a suitable clip type holder in the housing or casing 12. A 9 volt battery adapter interface may be provided at 35.

A ring detecting circuit 36 is connected to a telephone line bus 38 by connection 40. The IN and OUT jacks 20 and 22 are connected to the telephone line bus 38 by connections 42 and 44. An actuate/reset button switch circuit 46 is connected to the telephone line bus 38 by connection 48. The switch circuit 46 is controlled by the button 32 in FIG. 1

The monitor switch 23 is shown connected to the button circuit by connection 49. The battery 34 is connected to power the LED 30 through an energy conservation circuit 50 which is associated with a latch circuit 52. The connection may be made by connectors 54 and 56. The latch circuit is connected to the button switch circuit 46 by connector 58. A speaker 60 mounted behind the grill 28 is driven by an amplifier 62 connected to the button switch circuit 46 by connector 64. The speaker may be directly connected to the telephone line by a volume control switch 25 where amplification is not desired. However amplification provides assistance to persons with hearing impairment and the switch 25 may be provided in potentiometer form to permit graduated volume control.

The ring detector circuit 36 is powered from the telephone line bus 38 which is in turn connected to the telephone line in the particular premise involved through jack 20 and connection 42. The ring detector circuit comprises a conventional AC detector which detects the 105 volt 20–47 Hz ringing signal from the central office.

On detecting the ring signal the ring detector circuit 38 provides an actuate signal to conservation and latch circuits 50 and 52 over connection 66. On receiving this signal the conservation circuit 50 connects the lamp 30 to the battery 34 and the latch circuit 52 latches the battery to lamp connection in an "on" condition.

The conservation circuit provides a low duty cycle connection between the battery 34 and the LED lamp 30 to minimize battery drain. In a preferred circuit the battery source voltage is pulsed one second on and one second off and the pulses are differentiated in an RC circuit to provide only sufficient on time to the LED 30 to effect its observable illumination. This arrangement provides satisfactory life from the conventional 9 volt dry cell battery for no less than six months use under average residential telephone use conditions.

It is to be noted that the telephone network ring power is not used to energize the LED and that the energization of the LED does not correspond to the duration of the ring signals. The latch circuit 52 insures continued energization of the LED 30 from battery 34 until the latch circuit is released in a matter to be described hereinafter. This constitutes a significant feature of the device in that its non-use of telephone line power provides for FCC and Underwriters Laboratories approval.

It is also to be noted that battery power is utilized only after the ring signal triggers the lamp connection and that the device draws no battery current whatsoever in a standby condition.

The button switch circuit 46 is controlled by the button switch 32 (FIG. 1). Upon depressing of the button 32 the button switch circuit 46 releases the latch 52 via the connection 58. This latch release may comprise a simple switch function responsive to suitable contacts on the button switch 32. Release of the latch 52 results in disconnecting the power supply 34 to deactivate the LED lamp 30 thereby extinguishing that lamp.

Actuation of the button 32 is also effective to power the speaker amplifier 62 from the battery 34 through connections 54, 68 and 64. The actuation of button switch 32 also closes the audio circuit from the input of the speaker amplifier 62 to the telephone line bus 38 via connector 64, button switch circuit 46, connector 49, monitor switch 23 and connector 48. When this connection is established the speaker will monitor any signal on the telephone bus 38.

The reset switch 29 (FIG. 1) is provided to simply deactivate the lamp 30 where no voice message service is provided, as where the subscriber uses call forwarding. For this purpose the reset button may cause the switch circuit 46 to simply release the latch. The lamp and counter or LCD display then informs the customer of the number of forwarded calls. The circuit initially detects the incoming AC ring and identifies and establishes an internal ring cadence pattern through the circuit. Any disruption of this pattern is considered as the end of the incoming call and is counted as one incoming call. The device is useful in notifying users of incoming calls forwarded to another location.

The monitor switch 23 and associated circuitry in button switch circuit 46 connects the speaker to the telephone line bus either directly or through a transformer of sufficiently high resistance to prevent the establishment of the connection from creating an off-hook condition. Such a resistance is normally at least 600 ohms.

If the monitor switch 23 is "off" the speaker or amplifier circuit 62 is connected directly to the telephone bus 38 and the connection results in an off-hook condition which will interrupt a ring signal and seize the ringing line. On the other hand, when the monitor switch is in the "on" position the connection to the telephone line bus is established through a high resistance to permit monitoring but to prevent the creation of a line seizing off-hook condition. In both positions of the monitor switch the speaker monitors the telephone line bus and the speaker will reproduce any signals thereon.

In use the call management or "Call Alert" device is connected to the telephone line to be monitored by a connector having a RJ11 plug which is inserted into one of the RJ11 IN or OUT jacks 20 or 22. The other end of the connector is plugged into the premise telephone system ordinarily through another RJ11 jack. In many instances the most convenient connection may be made by removing the RJ11 plug from the RJ11 jack on an existing customer premise telephone and inserting the plug into the "IN" RJ11 jack 20 in the device. A second connector having RJ11 plugs at both ends is then connected between the "OUT" RJ11 jack 22 and the RJ11 jack in the telephone. This permits connection without having to access the RJ11 jack connection to the premise telephone system which in many instances is inconvenient.

It will be noted from FIG. 3 that both IN and OUT jacks 20 and 22 are connected to the telephone line bus 38 and thus are directly connected together. Alternative to the foregoing it is possible to connect the Call Alert device to the telephone wiring in the premise via any existing connection which is usually in the form of a RJ11 jack. As a still further alternative an additional jack can be installed and connected to the premise system at any site desired.

It will be appreciated that the unit need not be at the site of a telephone and thus may be utilized to provide a remote indication of the occurrence of a call. This feature is advantageous both with Central Office telephone answering or with telephone answering provided by a customer premise unit.

In the case of a CPE answering machine the device provides a remote indication of a call, or the absence of one, and avoids a trip to the answering machine to make the same observation. The low cost of the unit makes it feasible to utilize multiple units in multi-telephone premises to provide still further convenience.

Where CO telephone answering is provided the device not only provides a remote indication of a call but may be provided with a telephone keypad to permit interrogation to access a message without the necessity of going to the site of the telephone. This may be done by using the monitor switch to obtain an off-hook condition, the keypad to access the mailbox, and the speaker to monitor the message.

Figure 4:
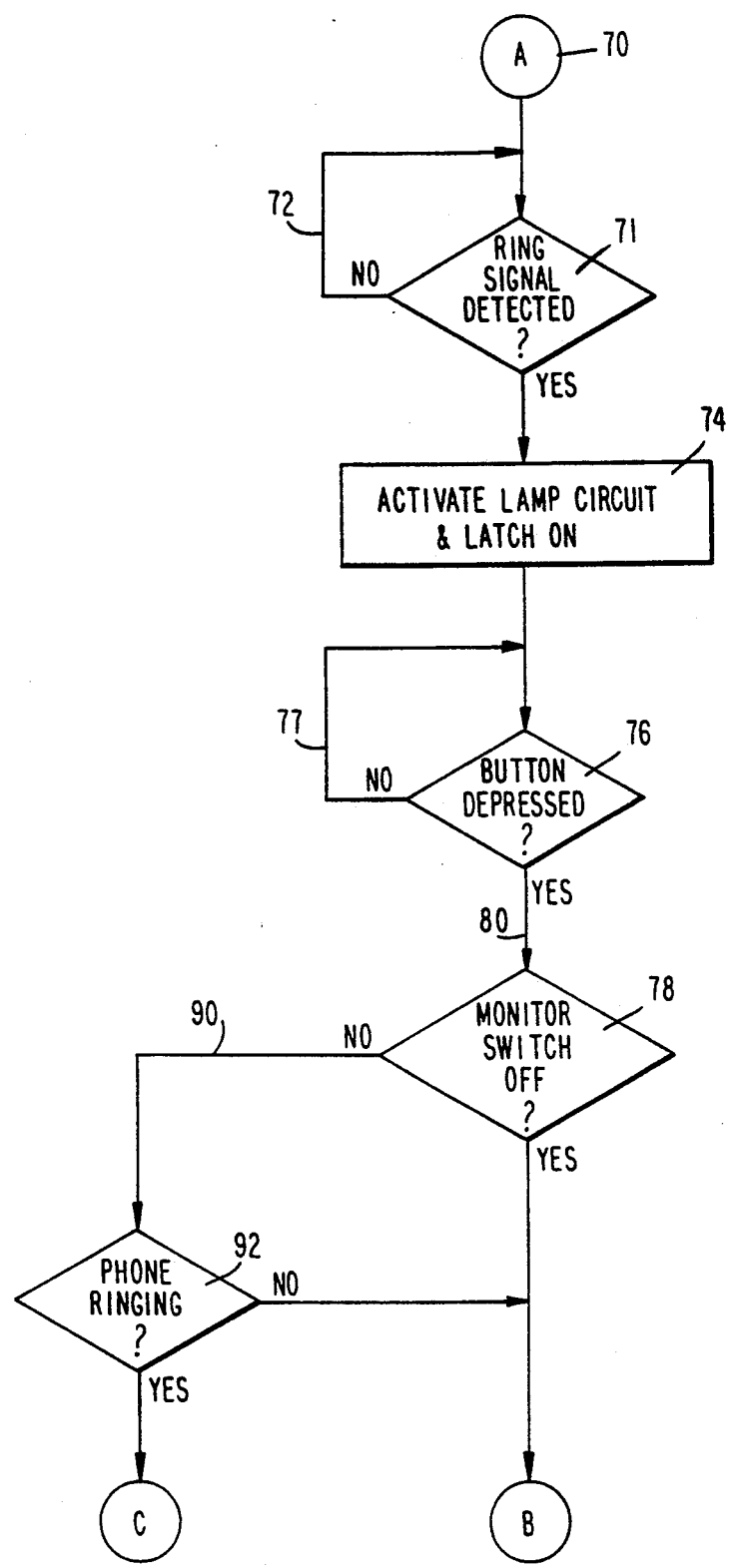
FIGS. 4, 5 and 6 illustrate a flow diagram showing the operation and use of the device of the invention.
Figure 5:
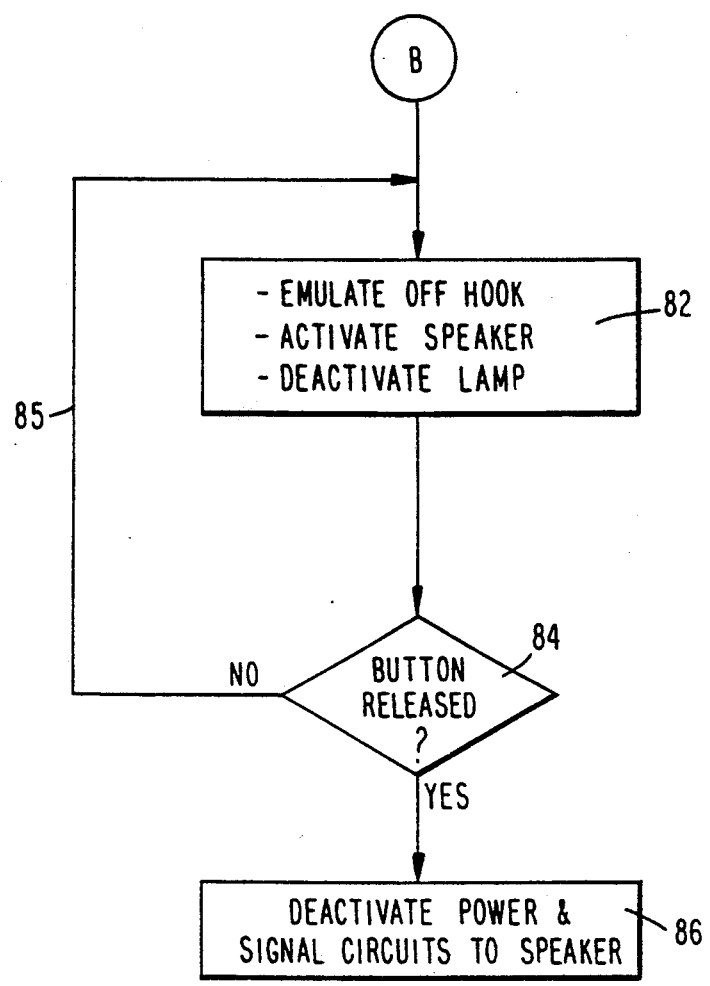
Figure 6:
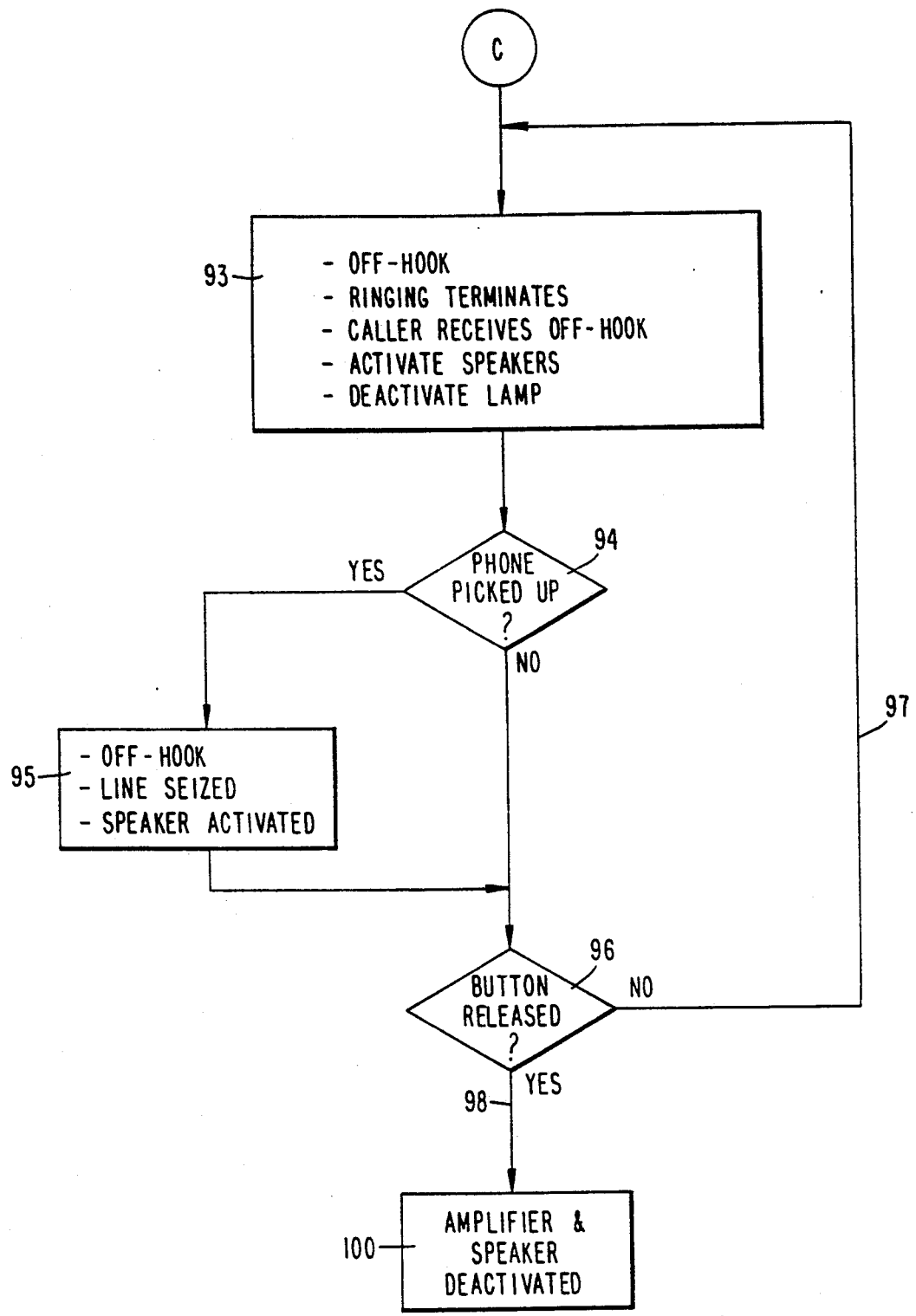

Assuming that the call management device is connected to the premise telephone system, operation is now described in conjunction with the flow chart of FIGS. 4–6.

Operation commences at A as indicated at 70 in FIG. 4. The call management device monitors the telephone line which is connected to the telephone line trunk for the presence of a ring signal. This determination is shown at 71 in FIG. 4. So long as no ring signal is detected the unit remains in an off condition as indicated at 72. In this condition there is no drain on the battery.

When a ring signal is detected by the ring detector circuit 36 the device performs multiple functions as indicated at 74. The ring detector circuit 36 generates a signal to the battery powered conservation/latch circuits 50, 52 to connect the lamp 30 through connectors 54 and 56 in FIG. 3. The latch circuit 52 thereupon latches into an ON condition and the lamp 30 remains ON following discontinuance of the ring signal. The lamp will continue in this ON condition in the absence of depression of the button 32 to actuate the button switch circuit 46. The determination of the condition of the button switch is made at 76. So long as the button is not depressed the lamp circuit will remain ON as indicated at 77.

The monitor switch 23 is either in an ON or an OFF condition and the determination as to its condition is made at 78. Assuming that the monitor switch is in the OFF condition the depression of the button 32, as indicated at 80, connects the speaker 60 and its associated amplifier 62 to the telephone bus 38 through a relatively high resistance. This emulates an off-hook condition and the speaker 60 monitors and reproduces any signals on the telephone line as indicated at 82 in FIG. 5. Depression of the button 32 thus permits monitoring of any existing voice signals. This may be convenient to provide listening access to multiple persons at the site of an off-hook telephone and/or may provide for monitoring at one or more remote locations with or without the presence of a telephone.

Depression of the button 32 also releases the latch circuit and extinguishes the lamp 30.

When the button 32 is released, a determination which is made at 84, in FIG. 5, the button switch circuit 45 causes a discontinuance of the power connection 68 to the amplifier 62 as well as a disconnection of the amplifier 62 from the telephone line bus 38. This is illustrated in FIG. 5 at 86. If the button is not released the monitor function continues as indicated at 85 in FIG. 5.

In the situation where the button 32 is depressed when the monitored telephone line is in an on-hook condition, the button switch circuit 46 and OFF monitor switch 23 establish an emulated off-hook condition. The condition is referred to as emulated in that the resistance prevents seizure of the line in the ringing situation. On the other hand the depression of the button 32 in a non-ringing condition emulates the off-hook condition to trigger the connection of the interrupted dial tone signal at the central office.

The depression of the button also powers the speaker and its amplifier through the button switch circuit 46. The speaker 60 is thus activated to monitor the line to permit the user to audibly detect the interrupted dial tone which is present where central office telephone answering is provided. This tone may be amplified so that the device provides assistance to those having a hearing disability. At the same time the depression of the button deactivates the latch 52, as described, to deactivate the lamp circuit and extinguish the lamp 30 as indicated at 82 in FIG. 5. If the presence of a message is indicated the user may then retrieve the message in the usual fashion for central office telephone answering service.

In the situation where the Monitor switch 23 is in the ON condition, as determined at 78 in FIG. 4, and the button 32 is depressed, the sequence which begins at 90 in FIG. 4 ensues. Referring to that figure, the determination is made at 92 as to whether or not the telephone is ringing when the button is depressed. In the event that the telephone is not ringing the sequence proceeds as just described in connection with FIG. 5. If the monitor switch 23 is ON and the telephone is ringing the sequence proceeds to C in FIG. 6 when the button 32 is depressed.

The amplifier-speaker 62-60 is connected to the telephone line bus 38 through a low resistance and creates an off-hook condition which seizes the ringing calling line. This is illustrated at 93 in FIG. 6. The ringing terminates with seizure and the lamp 30 is deactivated by the depression of the button. At the same time the amplifier 62 receives power from the battery 34 through the circuit 54, 68, 64 and commences monitoring of the now off-hook telephone line connected to the bus 38.

In most instances the caller, on hearing no voice response, will speak and provide the user with the opportunity to recognize (or not recognize) the voice. If the user recognizes the voice and desires to accept the call the user may lift the receiver of the telephone to create an off-hook condition which holds the line while the speaker remains activated as indicated at 95, 96 and 97.

If the button is released as indicated at 98 the amplifier/speaker are deactivated as shown at 100 but the connection and line is held by the off-hook telephone receiver. So long as the button is not released as shown at 97 the speaker continues to monitor the telephone line and permits multiple user monitoring of an ongoing conversation. If the button is again depressed the amplifier and speaker are again powered and placed into a monitoring condition. Such a condition may be established at any time by depressing the button 32.

As another embodiment of the invention the button circuit 46 may be connected to establish a monitoring condition only when the lamp 30 is activated.

It will be apparent from the foregoing that the device of the invention is capable of performing multiple functions in call management as an adjunct to either a central office based answering service or a customer premise answering machine. The device thus provides a visual alert that a call has been received in either the central office or consumer premise answering machine. Such a signal may be provided remote from any involved telephone or telephone answering machine and may be provided at multiple locations.

The unit additionally permits audible monitoring of the involved telephone line. This permits remote monitoring of the voice signal which may be provided by the answering machine to permit the user to remotely determine whether or not a pick up of the call is desired. The device also permits the interruption of a ringing signal to seize the line and audibly monitor the incoming signal to permit pick up of the incoming call following such monitoring if desired.

The device may serve as an audible monitor of an on-going conversation to permit simultaneous multiple user access to the signals on the line. The unit is relatively low in cost and capable of providing a significant degree of flexibility of use of telephone answering services whether network based or in the form of a customer premise answering machine.

In this disclosure there is shown and described only the preferred embodiment of the invention and a few examples of its versatility. It is to be understood that the invention is capable of use in various other combinations and environments and is capable or changes or modifications within the scope of the inventive concept as expressed herein.

We claim:

1. A telephone call management device comprising a detached housing having upper, lower and side walls, lamp means, button means and speaker grill means mounted in said upper wall, jack means mounted in a side wall for connecting said call management device through connector means to a telephone network termination node in a premise, battery means mounted within said housing, energy conservation circuit means mounted within said housing and adapted to be connected between said battery means and said lamp means to establish a low duty cycle connection therebetween when said lamp means is powered by said battery means, ring detector circuit means responsive to a ringing signal at said node to effect connection of said lamp means to said battery means through said energy conservation circuit means to cause illumination of said lamp means on detection of a ringing signal, latch means to latch said connection of said lamp means to said battery means to maintain said lamp means in an activated and illuminated condition, first switch means in said housing and associated with said button means to be actuated thereby to terminate said connection between said battery means and said lamp means to deactivate said lamp means, speaker means mounted within said housing and responsive to actuation of said button and switch means for connection to said termination node to cause said speaker means to audibly monitor signals at said termination node on said premise, second switch means mounted in said housing operative in one condition to cause said speaker means to be connected to audibly monitor said signals through a circuit having sufficient resistance to prevent the connection from seizing a calling telephone line to which said termination node is connected and operative in a second condition to cause said speaker means to be connected to audibly monitor said signals through a circuit having a resistance such that actuation of said switch means results in seizing a calling telephone line to which said termination node is connected, wherein the connection of said lamp means to said battery means is effected by power derived from said termination node and power to illuminate said lamp is derived from said battery means, and wherein said termination node is connected to a telephone answering machine and said speaker means is adapted to audibly monitor signals from said telephone answering means appearing at said termination node.

2. A telephone call management device comprising a housing including:

battery means, lamp means connected to be powered by said battery means, energy conservation circuit means associated with the connection between said battery means and said lamp means for establishing a low duty cycle connection therebetween when said lamp means is powered by said battery means, connector means for connecting said device to a telephone network node in a premise, ring detector means responsive to a ringing signal to effect connection of said lamp means to said battery means through said energy conservation circuit means to cause powering and illumination of said lamp means on detection of a ringing signal, latch means to latch said connection of said lamp means to said battery means to maintain said lamp means in an activated and illuminated condition, switch means for terminating said connection to deactivate said lamp means, speaker means responsive to actuation of said switch means for connection to audibly monitor signals on said telephone node in said premise, and manually operably button means for actuating said switch means;

wherein said button means includes a first button means for causing said speaker means to be connected to monitor said signal on said telephone node during the time said first button means is manually operated, and second button means for actuating said switch means.

3. A telephone call management device according to claim 2 wherein said first button means also actuates said switch means.

4. A telephone call management device according to claim 2 including volume control means for adjusting the volume of sound produced by said speaker means in response to said signal on said telephone node.

5. A telephone call management device according to claim 4 including amplifying means for amplifying said signal on said telephone node.

6. A telephone call management device according to claim 5 including display means and means associated with said ring detector means for causing said display means to provide a count which is a function of the input to the ring detector means.

7. A telephone call management device according to claim 6 including second connector means for connecting said device to a telephone on said premises.

8. A telephone call management device according to claim 7 wherein said first and second connector means comprise jack means mounted in said housing.

* * * * *